Patented Sept. 29, 1942

2,297,290

UNITED STATES PATENT OFFICE 2,297,290

SYNTHETIC RUBBERLIKE COMPOSITION

Gaetano F. D'Alelio, Pittsfield, Mass., assignor to General Electric Company, a corporation of New York No Drawing. Application December 1, 1939, Serial No. 307,144

8 Claims. (Cl. 260—36)

This invention relates to the production of synthetic rubber-like compositions and more particularly is directed to the preparation of such compositions of the class comprising polyvinyl halides, specifically polyvinyl chloride.

The present application is a continuation-in-part of my copending applications Serial Nos. 294,493, 294,494, 294,495, 294,496, and 294,497 now Patents 2,279,881; 2,279,882; 2,279,883; 2,279,884 and 2,279,885 respectively, all of which applications were filed September 12, 1939, and of Serial No. 302,169, filed October 31, 1939. All of these applications are assigned to the same assignee as the present invention.

Synthetic rubber-like compositions may be made from polyvinyl halides, such as polyvinyl chloride, by plasticizing the halogenated vinyl compound with a material which is substantially non-volatile at elevated temperature. A plasticizer heretofore widely used for softening polyvinyl halides is tricresyl phosphate. Although polyvinyl chloride plasticized with tricresyl phosphate yields satisfactory products for most applications, films produced therefrom discolor at elevated temperatures and lose their flexibility. Moreover, at elevated temperatures such films show little or no strength.

I have discovered that esters of itaconic acid act as plasticizers for polyvinyl halides such as, for example, polyvinyl chloride, and impart to such compositions a marked stabilizing effect at elevated temperatures. Films or thin sheets prepared from such compositions are clear, almost colorless or of a light yellow color, flexible, tough, have considerable elasticity and excellent tensile strength.

In order that those skilled in the art better may understand how the present invention may be carried into effect, the following illustrative examples thereof are given. All parts are by weight.

Example 1

| | Parts |
|---|---|
| Polyvinyl chloride | 150 |
| Dibenzyl itaconate | 54 | were blended at 130° C. to a uniform consistency and thereafter molded under pressure at about 145° C. to form a disk about 1/16 inch thick. The disk was of such flexibility that it could be folded back upon itself or rolled into the form of a tube, at room temperature, without cracking. In general, it had the flexibility characteristics of soft rubber of similar thickness. It was light yellow in color and of such transparency that ordinary newsprint could be read through it without difficulty. It was very tough and had considerable elasticity.

When 54 parts tricresyl phosphate were similarly incorporated into 150 parts polyvinyl chloride and the resulting mass molded into the form of a 1/16"-thick disk as above described, the disk had relatively slight flexibility, breaking into two pieces when effort was made to fold it back upon itself. The disk was highly discolored, being of a dark greenish-brown, and scarcely could be seen through when held before a strong light.

Example 2

Same as Example 1 with the exception that di-(isobutyl) itaconate was employed. An exceptionally clear, flexible molded disk was obtained.

Example 3

Same procedure and proportions of components as described under Example 1, with the exception that di(butoxy ethyl) itaconate was used. The molded disk was clear, soft and of good flexibility.

Example 4

The same technique was followed as in Example 1 using, however, 29.7 parts di-(cyclohexyl) itaconate instead of 54 parts dibenzyl itaconate. A clear molded disk, having approximately the same hardness as the tricresyl-phosphate-plasticized polyvinyl chloride described under Example 1, was obtained.

Example 5

Same as Example 1, but using 45.9 parts di-(phenyl ethyl) itaconate in place of 54 parts dibenzyl itaconate. A clear, flexible, strong, molded disk was obtained.

Example 6

Same as Example 1, but using 40.5 parts diphenyl itaconate instead of 54 parts dibenzyl itaconate. A very clear, fairly hard, molded disk was produced by molding the homogeneous mixture of components under heat and pressure.

Example 7

| | Parts |
|---|---|
| Polyvinyl chloride | 100 |
| Dihexyl itaconate | 13 |
| Di-(isoamyl) itaconate | 57 | were intimately milled under heat, as by sheeting on hot rolls for 5 minutes at a temperature corresponding to 60 pounds steam pressure, yielding a tough, rubbery sheet of plasticized polyvinyl chloride.

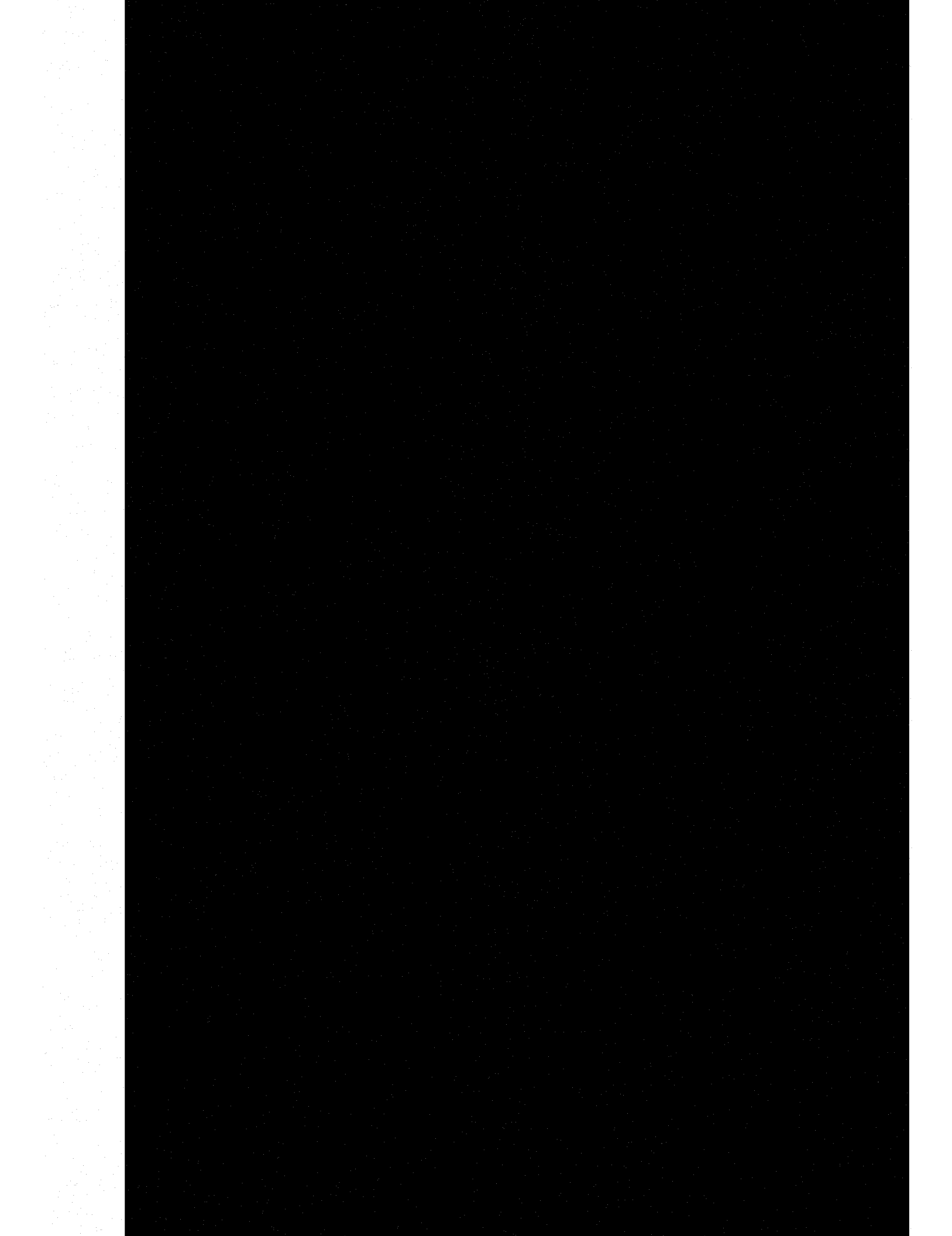

In producing these new synthetic compositions varying amounts of itaconic ester may be incorporated into the polyvinyl halide, depending, for example, upon the particular starting materials employed and the particular properties desired in the end-product. Ordinarily, however, the proportion of itaconic ester does not exceed 60 per cent by weight of the whole and in most cases is considerably less, for example from 10 to 50 per cent by weight of the mixed components.

The synthetic compositions of this invention are especially adapted for use as electrical insulation in producing insulated electrical conductors and cables. Substances adapted to improve the electrical properties of plasticized polyvinyl halides at elevated temperatures may be incorporated into the compositions prior to use as electrical insulation. Examples of such substances are given in Patents 2,118,017—Moyer M. Safford, issued May 17, 1938, and 2,171,334—Raymond M. Fuoss, issued August 29, 1939, both of which patents are assigned to the same assignee as the present invention. For most electrically insulating applications the consistency of the mass at an elevated temperature, e. g. at 100° to 175° C., should be such that it can be extruded upon a solid or stranded conductor such as copper wire. The new synthetic rubber-like electrical insulation may be used in conjunction with other insulation such as cellulose derivatives, e. g., cellulose esters such as cellulose acetate, etc., cellulose ethers such as ethyl cellulose, etc., regenerated cellulose, etc., or with rubber, chloroprene, asbestos, varnished cambric, polyvinyl acetals, e. g., polyvinyl formal, etc., alkyd resins, acrylic and alkacrylic esters, etc.

Molded articles of manufacture, e. g., electrical outlet boxes, electrical conduits, etc., also may be made from the modified or unmodified synthetic compositions of this invention. As modifying agents various fillers may be used, for example, wood flour, alpha flock, sand, asbestos, mica, paper, cloth, cellulose derivatives, natural and synthetic filaments or fibers, etc., in continuous, shredded or comminuted form. Pigments, dyes, opacifiers, mold lubricants, etc., likewise may be added as modifying agents. Polyvinyl halide, specifically polyvinyl chloride, plasticized with an itaconic ester or esters also may be used in the production of liquid coating compositions.

What I claim as new and desire to secure by Letters Patent of the United States is:

1. A composition comprising (1) a compound of the class consisting of polyvinyl halides and polyvinylidene halides, and (2) an itaconic diester of a carbocyclic-substituted saturated aliphatic monohydric alcohol.

2. A composition comprising a polyvinyl halide and a carbocyclic-substituted saturated aliphatic monohydric alcohol diester of itaconic acid.

3. A composition comprising a polyvinyl halide and a polymerized carbocyclic-substituted saturated aliphatic monohydric alcohol diester of itaconic acid.

4. A composition comprising polyvinyl chloride and a carbocyclic-substituted saturated aliphatic monohydric alcohol diester of itaconic acid.

5. A plastic composition comprising polyvinyl chloride and a carbocyclic-substituted saturated aliphatic monohydric alcohol diester of itaconic acid containing not less than 6 and not more than 15 carbon atoms in the alcohol radical.

6. A composition comprising polyvinyl chloride and a symmetrical carbocyclic-substituted saturated aliphatic monohydric alcohol diester of itaconic acid.

7. A composition according to claim 1 wherein the itaconic ester is di-(benzyl) itaconate.

8. A composition according to claim 1 wherein the itaconic ester is di-(phenoxy ethyl) itaconate.

GAETANO F. D'ALELIO.